March 10, 1931.   T. P. CHASE   1,795,290
BRAKE OPERATING MECHANISM
Filed Dec. 23, 1929

Inventor
Theron P. Chase
By Blackmore, Spencer & Hulse
Attorneys

Patented Mar. 10, 1931

1,795,290

UNITED STATES PATENT OFFICE

THERON P. CHASE, OF DETROIT, MICHIGAN, ASSIGNOR TO GENERAL MOTORS RESEARCH CORPORATION, OF DETROIT, MICHIGAN, A CORPORATION OF DELAWARE

BRAKE-OPERATING MECHANISM

Application filed December 23, 1929. Serial No. 415,994.

This invention relates to brakes, and particularly to the operating mechanism associated with the brakes of vehicle wheels. An object of the invention is to prevent the entry of oil to the brake shoes, to reduce the overhang of the operating arm for the shaft bearing and to otherwise improve the construction by which the rotating rock shaft applies the brake.

Figure 1:
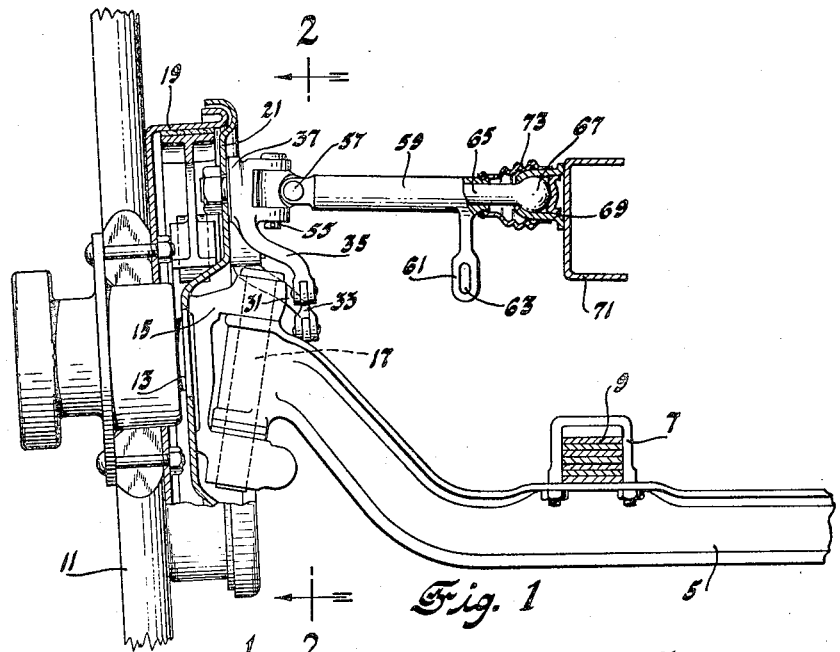
Figures 2, 3:
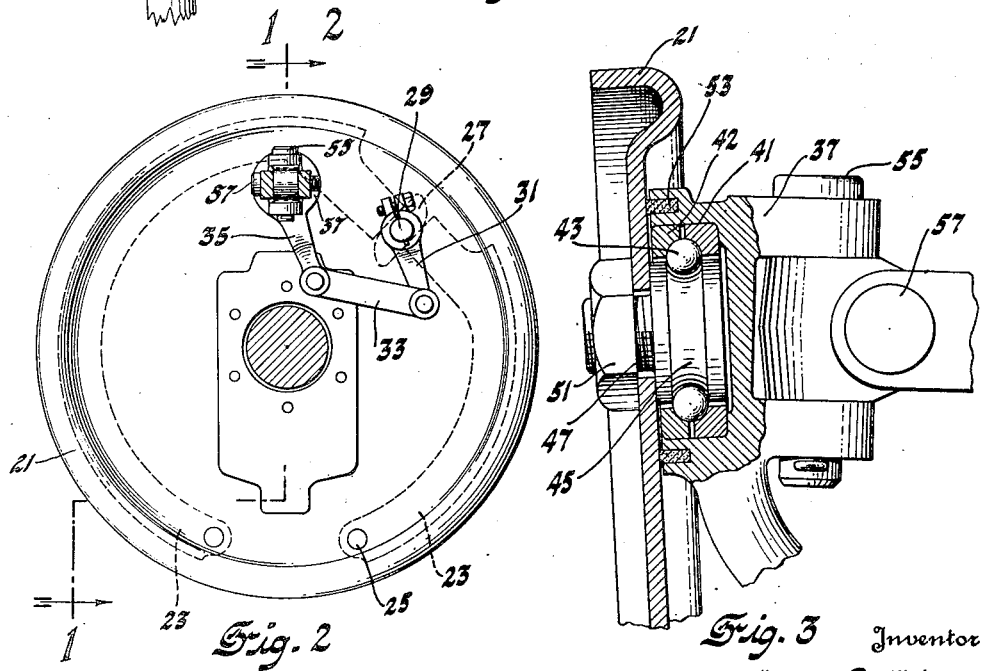

In the drawing, Figure 1 is a view in elevation, partly in section; Figure 2 is a view in elevation as seen in line 2—2 of Figure 1; Figure 3 is a vertical section through the shaft mounting.

Referring by reference character to the drawing, numeral 5 represents a vehicle axle, the drawing showing a front axle. To the axle 5 is secured by clips 7 a supporting spring 9. At 11 is a wheel rotatable upon a stub axle 13 carried by a knuckle 15, the latter pivoted to the axle 5 by knuckle pin 17. The wheel carries a brake drum 19 and the knuckle carries a backing plate 21 closing the drum. The brake shoes 23 are pivoted to the backing plate 21 at 25. They are expanded into frictional engagement with the drum by a cam 27 engaging their adjacent unanchored ends. A cam shaft 29 is rotatably mounted on the backing plate 21 and is provided with an arm 31 outside the drum enclosure. The arm 31 is pivoted to a link 33, the other end of which is pivotally connected to an arm 35 which is extended from a rock shaft 37. A shaft corresponding to shaft 37 has been heretofore employed and it has been customary to provide the backing plate with a bushing or sleeve extending through the backing plate into the drum enclosure to rotatably support the shaft. In the present case the shaft is recessed as at 41 and receives the outer race 42 for the balls 43 of a bearing. The inner race 45 is secured to or integral with a threaded member 47 extending through the backing plate 21. A nut 51 threaded on the stem 47 within plate 21 secures this inner race in position adjacent the outer face of the backing plate. Around the recess 41 the shaft may be provided with packing 53. The ball bearing is of the type shown, designed to resist lateral thrust as well as to carry radial loads.

The shaft 37 is universally jointed, the joint including pins 55 and 57 to an apertured cross shaft 59, having an arm 61 apertured as at 63 for a connection therewith of suitable brake operating linkage. Shaft 59 slidably receives a shaft 65 terminating in a ball 67 rotatably supported in a bracket or socket 69 preferably carried by chassis frame 71. If desired, the ball joint may be protected by a boot 73. In prior constructions the lubricant used for the equivalent of the short shaft 37 frequently reached the shoes and the friction surface of the drum inasmuch as this shaft was rotatably supported in a sleeve extending through the backing plate into the drum enclosure, as explained above. By the present simple construction, wherein the bearing for the short shaft is positioned wholly outside the backing plate, this bearing may be adequately lubricated without any danger of the lubricating medium reaching the brake members within the drum. Also, in said prior constructions, the equivalent arm corresponding with lever 35 was axially removed from the bearing. In the present case, it will be seen that the hub portion of the lever is substantially in the plane of the ball bearing.

I claim:

1. In combination with a vehicle having a wheel, a brake drum on said wheel, brake means within said drum, a backing plate, a rock shaft, connecting mechanism between said rock shaft and said brake means, a bearing carried by said backing plate and located wholly outside the brake enclosures, said rock shaft rotatable on said bearing, and a second support on said vehicle for said rock shaft.

2. The invention defined by claim 1, said second support including a second shaft, a universal joint between the rock shaft and the second shaft, a third shaft axially slidable relative to the second shaft and means to rotatably mount the remote end of the third shaft.

3. In combination with a vehicle having a wheel, a brake drum thereon, braking means within said drum, a backing plate, expanding means for said brake, including a shaft extending through said backing plate, a lever arm on said shaft, a short rock shaft positioned wholly outside said backing plate, said short shaft having a lever arm, a link connecting said lever arms, means to rotate said short shaft and means carried by said backing plate to rotatably support said short shaft.

4. The invention defined by claim 3, said last named means including a radial and thrust bearing outside the drum enclosure.

5. The invention defined by claim 4, said short shaft lever extending from said shaft adjacent the plane of the bearing.

6. The invention defined by claim 3, said short shaft having a recessed face engaging said backing plate, said rotatable supporting means received within said recesses.

In testimony whereof I affix my signature.

THERON P. CHASE.